United States Patent
Casamassima et al.

(10) Patent No.: US 10,427,643 B1
(45) Date of Patent: Oct. 1, 2019

(54) DEFENSE AGAINST RELAY ATTACK IN PASSIVE KEYLESS ENTRY SYSTEMS

(71) Applicant: NXP B.V., Eindhoven (NL)

(72) Inventors: Filippo Casamassima, Graz (AT); Matjaž Guštin, Graz (AT); Wolfgang Eber, Graz (AT)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/034,571

(22) Filed: Jul. 13, 2018

(51) Int. Cl.
  *B60R 25/24* (2013.01)
  *H04B 17/318* (2015.01)

(52) U.S. Cl.
  CPC ......... *B60R 25/241* (2013.01); *H04B 17/318* (2015.01); *B60R 2325/101* (2013.01); *B60R 2325/108* (2013.01)

(58) Field of Classification Search
  None
  See application file for complete search history.

(56) References Cited

U.S. PATENT DOCUMENTS

| | | | |
|---|---|---|---|
| 8,463,540 B2 | 6/2013 | Hannah et al. | |
| 9,102,296 B2 | 8/2015 | Seiberts et al. | |
| 9,558,607 B2 | 1/2017 | Eder | |
| 9,672,671 B2 | 6/2017 | Seiberts et al. | |
| 10,124,768 B1* | 11/2018 | Bocca | G07C 9/00309 |
| 2004/0201277 A1 | 10/2004 | Hentsch et al. | |
| 2011/0057817 A1* | 3/2011 | Proefke | G01S 13/74 |
| | | | 340/989 |
| 2014/0169193 A1* | 6/2014 | Eder | H04L 43/08 |
| | | | 370/252 |
| 2014/0340193 A1* | 11/2014 | Zivkovic | G07C 9/00111 |
| | | | 340/5.61 |
| 2016/0267735 A1* | 9/2016 | Hamada | G07C 9/00309 |
| 2017/0190316 A1* | 7/2017 | Kim | B60R 25/24 |
| 2019/0182672 A1* | 6/2019 | Kuenzi | H04W 76/10 |

OTHER PUBLICATIONS

Liu, Chen et al; "RDL: A Novel Approach for Passive Object Localization in WSN Based on RSSI"; IEEE ICC—Ad-hoc and Sensor Networking Symposium; 5 pages (2012).

* cited by examiner

*Primary Examiner* — Carlos Garcia
(74) *Attorney, Agent, or Firm* — Charlene R. Jacobsen

(57) ABSTRACT

A system includes a first unit associated with an object and a second unit. The first unit includes a first transceiver coupled with first processing circuitry. The second unit includes a second transceiver coupled with second processing circuitry. Methodology includes establishing a bidirectional wireless communication link between the first and second units. Following establishment of the communication link, the first and second units exchange messages. The first processing circuitry measures a first received signal strength indicator (RSSI) value for each of the messages received at the first unit and sends the first RSSI value in a subsequent message to the second unit. The second processing circuitry measures a second RSSI value for each of the messages received at the second unit and sends the second RSSI value in another subsequent message to the first unit. A relay attack is determined in response to the first and second RSSI values.

20 Claims, 8 Drawing Sheets

PRIOR ART

DEFENSE AGAINST RELAY ATTACK IN PASSIVE KEYLESS ENTRY SYSTEMS

TECHNICAL FIELD OF THE INVENTION

The present invention relates generally to passive keyless entry systems. More specifically, the present invention relates to systems and methodology for defending against relay attacks on the passive keyless entry systems.

BACKGROUND OF THE INVENTION

Vehicle manufacturers are increasingly implementing Passive Keyless Entry (PKE) systems and Passive Keyless Entry and Start (PKES) systems. A PKE system provides a user with the convenience of unlocking a vehicle door without physically touching a key or pressing any buttons on a key fob. A PKES system allows a user to both unlock and start his or her vehicle without physically touching a key or pressing any buttons on a key fob. These systems improve driver safety and provide convenience for the driver in that the vehicle key fob can remain stowed, for example, in his or her pocket or bag when approaching or preparing to start the vehicle. Unfortunately, PKE and PKES systems can be vulnerable to relay attacks. In a relay attack, the attackers place one relay attack station in proximity to the key and another relay attack station in proximity to the vehicle. The attackers can then relay messages between the key and the vehicle via the relay stations, enabling the vehicle to be opened and started even if the key is physically distant from the vehicle.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

Figure 1:
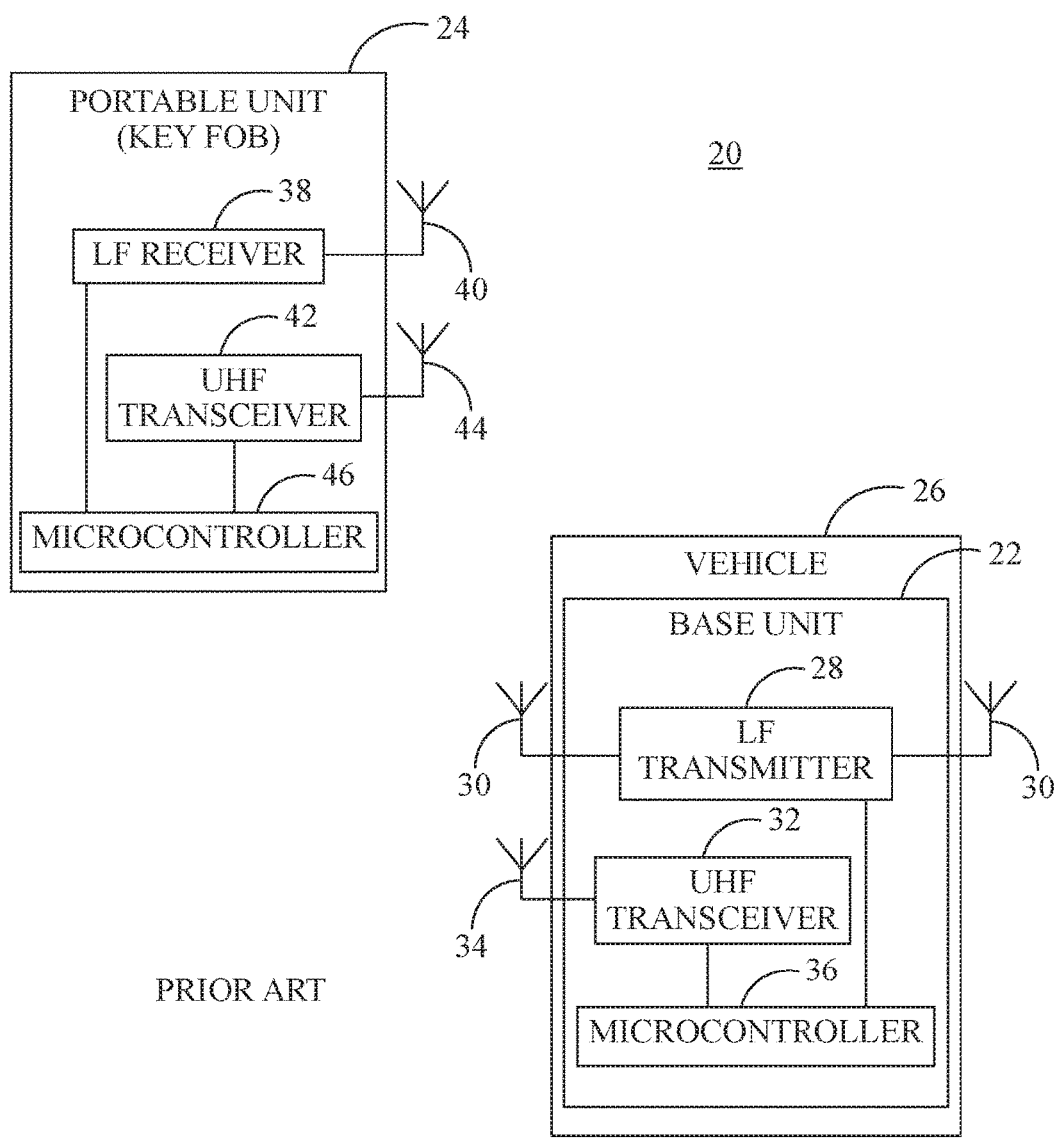
FIG. 1 shows a block diagram of a prior art passive keyless entry (PKE) system.

In overview, the present disclosure concerns systems and methodology for defending against relay attacks on passive keyless entry (PKE) systems. More particularly, the system and methodology provide countermeasures against relay attacks for PKE systems based at least in part on received signal strength indicator (RSSI) values measured by both a portable unit and a base unit, in which the base unit is associated with an object to be secured against unauthorized access. The measured RSSI values may be compared to verify that they agree and thus the likelihood of a relay attack is lower. The methodology may be combined, in some embodiments, with a variable transmission power technique and/or an RSSI tracking technique over time (both techniques using RSSI values measured by both of the portable and base units) to greatly improve security against relay attacks.

The following description is provided in connection with a PKE system as an automotive security system for preventing unauthorized access to a vehicle. The following discussion applies equivalently to a Passive Keyless Entry and Start (PKES) system or enhanced systems that enable other passive vehicle control features of a portable unit (e.g., key fob, wallet card, smartphone, and the like), such as mirror control, lighting control, seat adjustment, and the like. As used herein, the term "vehicle" includes any type of vehicle that can be driven such as automobiles, trucks, and busses, as well as boats, jet skis, snowmobiles, and other forms of transportation that are operable with a wireless key fob, wallet card, smartphone, controller, and so forth. Additionally, it should be understood that the following description applies equivalently to any PKE system used to secure other objects against unauthorized access, such as buildings or areas of buildings.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in integrated circuits (ICs) including possibly application specific ICs or ICs with integrated processing or control or other structures. It is expected that one of ordinary skill, notwithstanding possibly significant effort and many design choices motivated by, for example, available time, current technology, and economic considerations, when guided by the concepts and principles disclosed herein will be readily capable of generating such ICs and structures with minimal experimentation. Therefore, in the interest of brevity and minimization of any risk of obscuring the principles and concepts according to the present invention, further discussion of such structures and ICs, if any, will be limited to the essentials with respect to the principles and concepts of the various embodiments.

Figure 2:
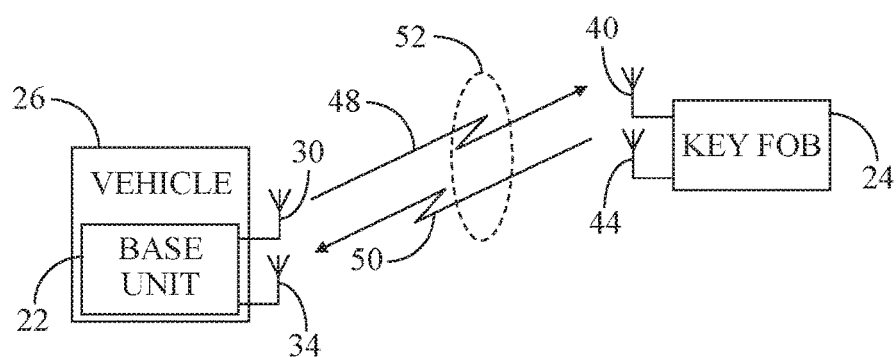
FIG. 2 schematically represents communication between a base unit and a portable unit of the PKE system of FIG. 1.

Referring now to FIG. 1, FIG. 1 shows a block diagram of a prior art passive keyless entry (PKE) system 20 and FIG. 2 schematically represents communication between a base unit 22 and a portable unit 24 of PKE system 20. In general, base unit 22 is associated with (e.g., located within) a vehicle 26 to be secured against unauthorized access and portable unit 24, referred herein as a key fob 24, may be carried by an operator of vehicle 26. Although the portable unit is referred to herein as key fob 24, it should be understood that the portable unit may be a wallet card, a smartphone, controller, or any other wireless communication device configured to enable the control features of vehicle 26 (e.g., lock/unlock and vehicle start).

Base unit 22 may include a plurality of low frequency (LF) transmitters 28 (one shown for simplicity) coupled to antennas 30 and an ultra-high frequency (UHF) transceiver 32 coupled to an antenna 34. LF transmitters 28 and UHF transceiver 32 may be connected to a microcontroller 36, or other type of processing circuitry. LF transmitters 28 may be installed at various locations around vehicle 26 (e.g., inside each door near the door handles, in the trunk, and so forth). Key fob 24 may include an LF receiver 38 coupled to an antenna 40 and a UHF transceiver 42 coupled to an antenna 44. LF receiver 38 and UHF transceiver 42 are connected to a microcontroller 46.

In an example, each transmitter 28 at base unit 22 is configured to transmit a wireless signal 48 (see FIG. 2). Wireless signal 48 may be a low frequency (LF) signal transmitted from LF transmitter 28 via its associated antenna 30. LF receiver 38 at key fob 24 may receive wireless signal 48 and measure the received signal strength indicator (RSSI) of the received signal to determine whether key fob 24 is within wireless range of at least one of transmitters 28 and to "wake up" or otherwise activate the components within key fob 24. If key fob 24 is within wireless range of at least one of transmitters 28, key fob 24 may send the measured RSSI and authentication information via another wireless signal 50 (see FIG. 2). By way of example, wireless signal 50 may be a UHF signal transmitted from UHF transceiver 42 via its associated antenna 44 for receipt at UHF transceiver 32 at base unit 22. Following authentication at base unit 22, a bidirectional wireless communication link 52 is established between base unit 22 and key fob 24, and one or both of base unit 22 and key fob 24 are configured to enable control features of key fob 24 through further messaging. These control features may entail door unlock/lock, vehicle start, mirror control, lighting control, seat adjustment, and other remote control features.

In FIG. 2, a dashed oval encircles wireless signals 48, 50 to represent bidirectional wireless communication link 52. Although wireless signal 48 may initially be a LF signal, in subsequent communications between base unit 22 to key fob 24, wireless signal 48 may be an UHF signal communicated toward key fob 24 via UHF transceiver 32 and antenna 34 of base unit 22. Thus, wireless signal 48 represents any message being communicated from base unit 22 toward key fob 24 and wireless signal 50 represents any message being communicated from key fob 24 toward base unit 22. Accordingly, bidirectional wireless communication link 52 represents a bidirectional wireless connection between base unit 22 and key fob 24. The frequency band of the LF signals may be between 30 kHz and 300 kHz, and the UHF frequency band may be between 300 MHz and 1 GHz.

Figure 3:
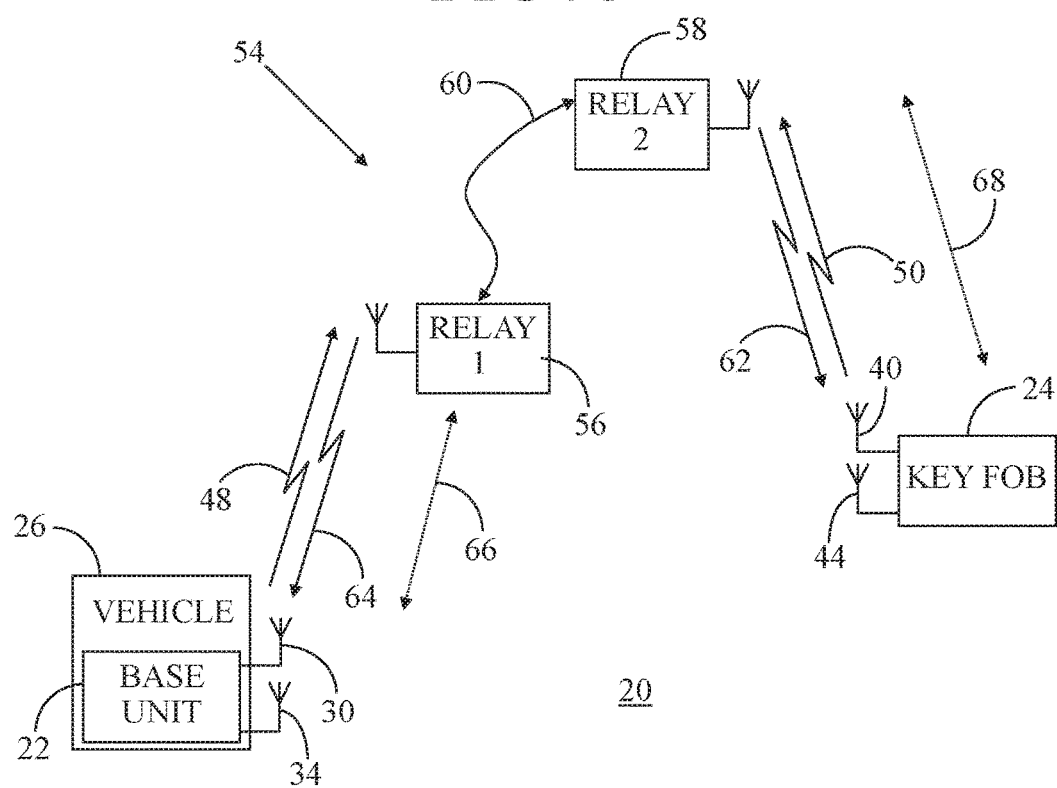
FIG. 3 schematically represents a "relay attack" in the PKE system of FIG. 1.

FIG. 3 schematically represents a "relay attack" 54 in PKE system 20. In relay attack 54 at least two relay stations 56, 58 and a transmission link 60 are introduced in PKE system 20. The first relay station 56 acts as an emulator for base unit 22 within vehicle 26 and the second relay station 56 acts as an emulator for key fob 24. Communication takes place between first and second relay stations 56, 58 via transmission link 60. Transmission link 60 between first and second relay stations 56, 58 may have at least one bi-directional transmission channel of any desired type that allows a distance between first and second relay stations 56, 58 to be greater than the maximum distance between base unit 22 and key fob 24.

In an example, first relay station 56 is brought in close proximity to vehicle 26 by a first thief in order to receive wireless signal 48 from LF transmitter 28/antenna 30 of base unit 22. First relay station 56 carried by the first thief picks up wireless signal 48 and relays the signal over transmission link 60 (possibly at a different power level or frequency) to second relay station 58. Second relay station 58 is within close proximity to key fob 24. For example, a second thief may follow and stand near the owner of vehicle 26 so that second relay station 58 is close to key fob 24. Upon receiving wireless signal 48 from first relay station 56 via transmission link 60, second relay station 58 generates a wireless signal 62 to be received at key fob 24. Key fob 24 receives wireless signal 62 via transmission from second relay station 58.

Key fob 24 cannot distinguish second relay station 58 from base unit 22 at vehicle 26, and is therefore unaware that wireless signal 62 originated from second relay station 58. Nevertheless, key fob 24 starts to authenticate itself to base unit 22 at vehicle 26 by transmitting wireless signal 50. Sharing the same operational principle described above, second relay station 58 located in close proximity to key fob 24 receives wireless signal 50 and relays signal 50 to first relay station 56 via transmission link 60. First relay station 56 generates a wireless signal 64 copying the content of the original wireless signal 50 from key fob 24 and transmits wireless signal 64 toward vehicle 26. Base unit 22 cannot distinguish first relay station 56 from portable unit 24, and is therefore unaware that wireless signal 64 originated from first relay station 56. As such, base station 22 at vehicle 26 can be tricked into believing that first relay station 56 is key fob 24. Thereafter, the control features of key fob 24 may be enabled to unlock and possibly start vehicle 26 with the intent of vandalizing or stealing vehicle 26. Accordingly, in a relay attack (e.g., relay attack 54), first and second relay stations 56, 58 need not decrypt nor understand the content of the signals (e.g., LF signal 48, UHF signal 50, and wireless signals 62, 64). Instead, first and second relay stations 56, 58 only need to receive them on one side and reproduce them on the other side as they are.

In wireless communications, an RSSI value is indicative of a measurement of the power present in a received wireless signal. As is widely known, power dissipates from a point source as it moves further away so that the relationship between power and distance is such that the power (e.g., represented by the RSSI value) is inversely proportional to the distance travelled. A first distance 66 between base unit 22 and first relay station 56 is variable. Likewise, a second distance 68 between second relay station 58 and key fob 24 is variable. Furthermore, first distance 66 is unlikely to be equivalent to second distance 68. Thus, first and second distances 66, 68 are represented by dotted lines of unequal length. Due to symmetry in electromagnetism, when a relay attack is not occurring (as shown in FIG. 2), the RSSI value measured at base unit 22 should be very similar to the RSSI value measured at key fob 24 when using the same wireless technology, with some differences due mainly to small variation in the transmission power and environmental changes (e.g. movement of the holder of key fob 24).

Embodiments presented below are directed toward defending against relay attacks (e.g., relay attack 54) on systems, such as passive keyless entry (PKE) systems, utilizing received signal strength indicator (RSSI) values measured by both a portable unit and a base unit. In some embodiments, the base and portable units may be equipped with Bluetooth® wireless technology or Bluetooth Low Energy wireless technology. Bluetooth wireless technology, and in particular Bluetooth Low Energy (referred to herein as BLE) wireless technology, may be preferred because it is a widespread technology that is available in many devices (thus allowing a smartphone to be used as a key), it uses a band spectrum available in all countries, and it is intrinsically low power and suitable for implementation in portable units, such as a key fob. Furthermore, it enables encrypted and secure communication between two devices and its frequency hopping characteristic could make a relay attack more difficult than a fixed frequency communication (like UHF or LF). Although Bluetooth is discussed in connection with some embodiments, other suitable wireless technologies may alternatively be implemented.

Figure 4:
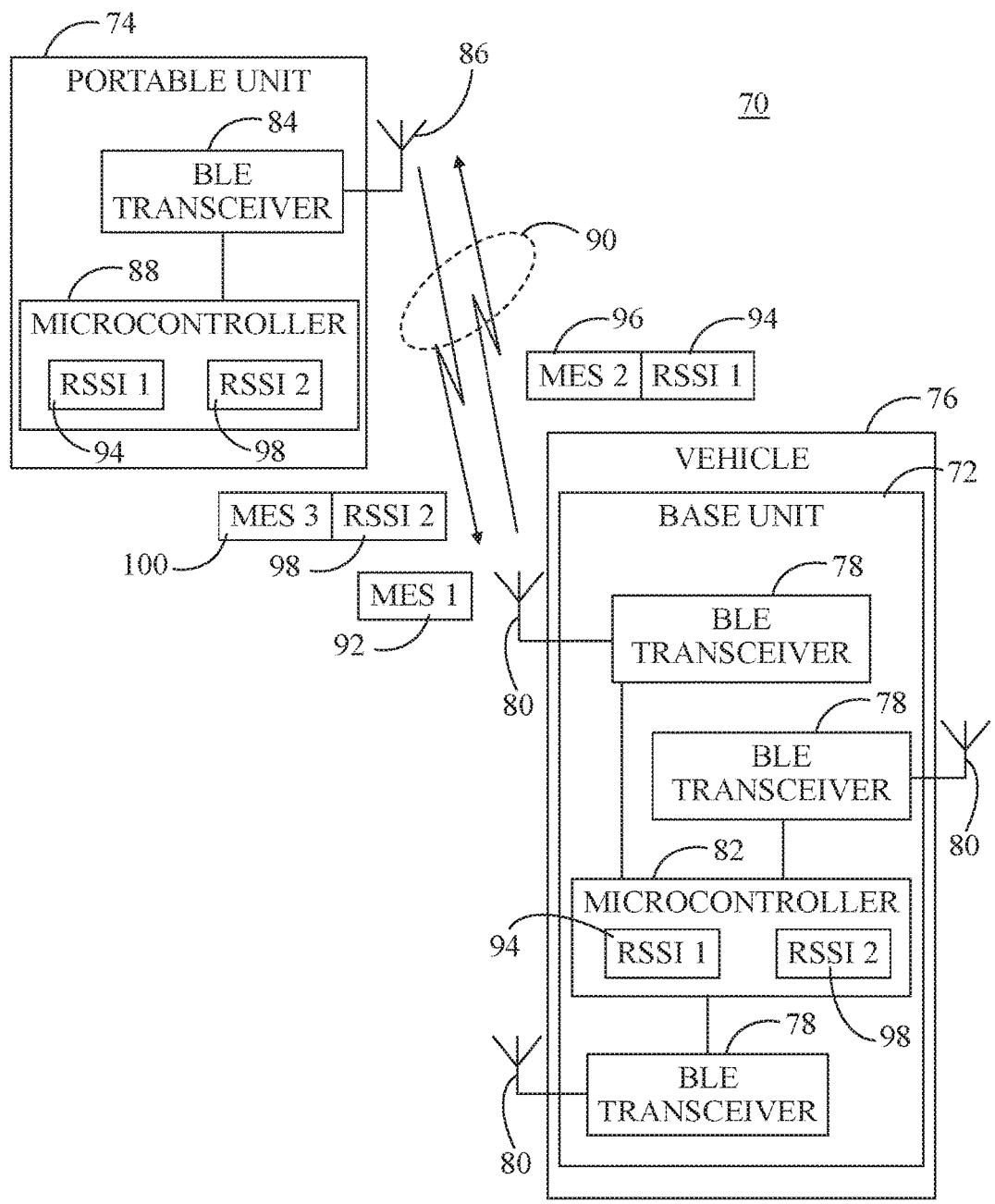
FIG. 4 shows a block diagram of a passive keyless entry system in accordance with an embodiment.

FIG. 4 shows a block diagram of a PKE system 70 in accordance with an embodiment. PKE system 70 includes a first unit, referred to herein as a base unit 72, and a second unit, referred to herein as a portable unit 74. Base unit 72 is associated with (e.g., located within) an object (e.g., a vehicle 76) to be secured against unauthorized access. Portable unit 74 (such as a key fob, wallet card, smartphone, and so forth) may be carried by an operator of vehicle 76. Base unit 72 generally includes one or more first transceivers 78 coupled to associated antennas 80. First processing circuitry, for example, a first microcontroller 82, is coupled to each of first transceivers 78. Portable unit 74 generally includes a second transceiver 84 coupled to an antenna 86, and second processing circuitry, for example, a second microcontroller 88, coupled to second transceiver 84. Of course, base unit 72 and portable unit 74 may additionally include other components such as memory elements, a key pad as part of portable unit 74, and so forth that may be useful for the operational function of base and portable units 72, 74. In this example, first and second transceivers 78, 84 may be Bluetooth transceivers, and more particularly Bluetooth Low Energy (BLE) transceivers. Thus, first and second transceivers 78, 84 may be referred to herein as first and second BLE transceivers 78, 84.

In general, when base and portable units 72, 74 are not connected, one will be in an "advertising" status (transmitting the availability of the device to establish a connection) and the other will be in a "scanning" status (listening for an advertising device). Once an encrypted connection (e.g., a bidirectional wireless communication link 90) is established per a Bluetooth wireless standard, base and portable units 72, 74 begin to exchange messages. In accordance with an embodiment, following establishment of bidirectional wireless communication link 90, base and portable units 72, 74 are configured to exchange messages. For each of the messages received at the base unit 72, first microcontroller 82 measures a received signal strength indicator (RSSI) value of the received message and sends the RSSI value in a subsequent message to portable unit 74. For each of the messages received at portable unit 74, second microcontroller 88 measures a second RSSI value of the received message and sends the second RSSI value in another subsequent message to base unit 72. Thus, for every received message, the RSSI value is measured and sent to the other party during the next message exchanged. Thereafter, at least one of first and second microcontrollers 82, 88 is configured to determine whether relay attack 54 (FIG. 3) is occurring in response to the first and second RSSI values.

In the illustrative example provided in FIG. 4, bidirectional wireless communication link 90 has been established. A first message 92 is transmitted from portable unit 74 via BLE transceiver 84/antenna 86. First message 92 is received at base unit 72, and first microcontroller 82 measures a first RSSI value 94 of first message 92. First microcontroller 82 may additionally retain, or otherwise save, the measured first RSSI value 94. Thereafter, first microcontroller 82 sends first RSSI value 94 in a second message 96 to portable unit 74 via BLE transceiver 78/antenna 80. Second message 96 is received at portable unit 74 at which point second microcontroller 88 measures a second RSSI value 98 of second message 96. Second microcontroller 88 may additionally retain, or otherwise save, the measured second RSSI value 98. Thereafter, second microcontroller 88 sends second RSSI value 98 in a third message 100 to base unit 72 via BLE transceiver 84/antenna 86.

During this exchange of messages, each of first and second microcontrollers 82, 88 becomes cognizant of the measured first and second RSSI values 94, 98. At least one of first and second microcontrollers 82, 88 may make a determination as to whether relay attack 54 (FIG. 3) is occurring in response to the measured first and second RSSI values 94, 98. In particular, based on the symmetry of electromagnetism, first and second RSSI values 94, 98 should be approximately equivalent when the messages are being communicated directly between base and portable units 72, 74 (e.g., without intervening relay stations and the associated distance variability discussed in connection with FIG. 3).

If a difference between first and second RSSI values 94, 98 is not within a predefined threshold, relay attack 54 is detected and bidirectional wireless communication link 90 may be terminated. However, if the difference between first and second RSSI values 94, 98 is within the predefined threshold, it may be presumed that relay attack 54 is not occurring and bidirectional wireless communication link 90 may be utilized for data exchange to enable implementation of remote control features (lock/unlock, vehicle start, etc.) of portable unit 74. Accordingly, Bluetooth wireless technology is utilized in PKE system 70 both for measurement of RSSI values and for data communication between base and portable units 72, 74 for the purpose of enabling remote control features of portable unit 74.

The computations and final decision about whether to enable the remote control features may be performed independently at both base unit 72 and portable unit 74, since both base and portable units 72, 74 collect the measured RSSI values from both sides. Alternatively, the computations and final decision may be centralized at one of the devices (e.g., base unit 72 associated with vehicle 76 which may have more computation power and more energy resources).

In order to trick PKE system 70 during a relay attack, the relay station attacker would be required to adjust the transmission power of its relay so that the measured RSSI values at base unit 72 and portable unit 74 would be very similar. It is presumed that such a situation would be difficult since the attacker typically does not have control of the distance from portable unit 74. Additionally, a typical relay station does not have the capability of intercepting the content of encrypted packets of data and thus decoding the exchanged RSSI values. Nevertheless, additional security measures may be implemented to further thwart an attempted relay attack, as will be discussed below. More detailed discussion of the use of measured RSSI values for the determination of a relay attack will be provided below in connection with the flowcharts of FIGS. 6, 7, 9, and 10.

Figure 5:
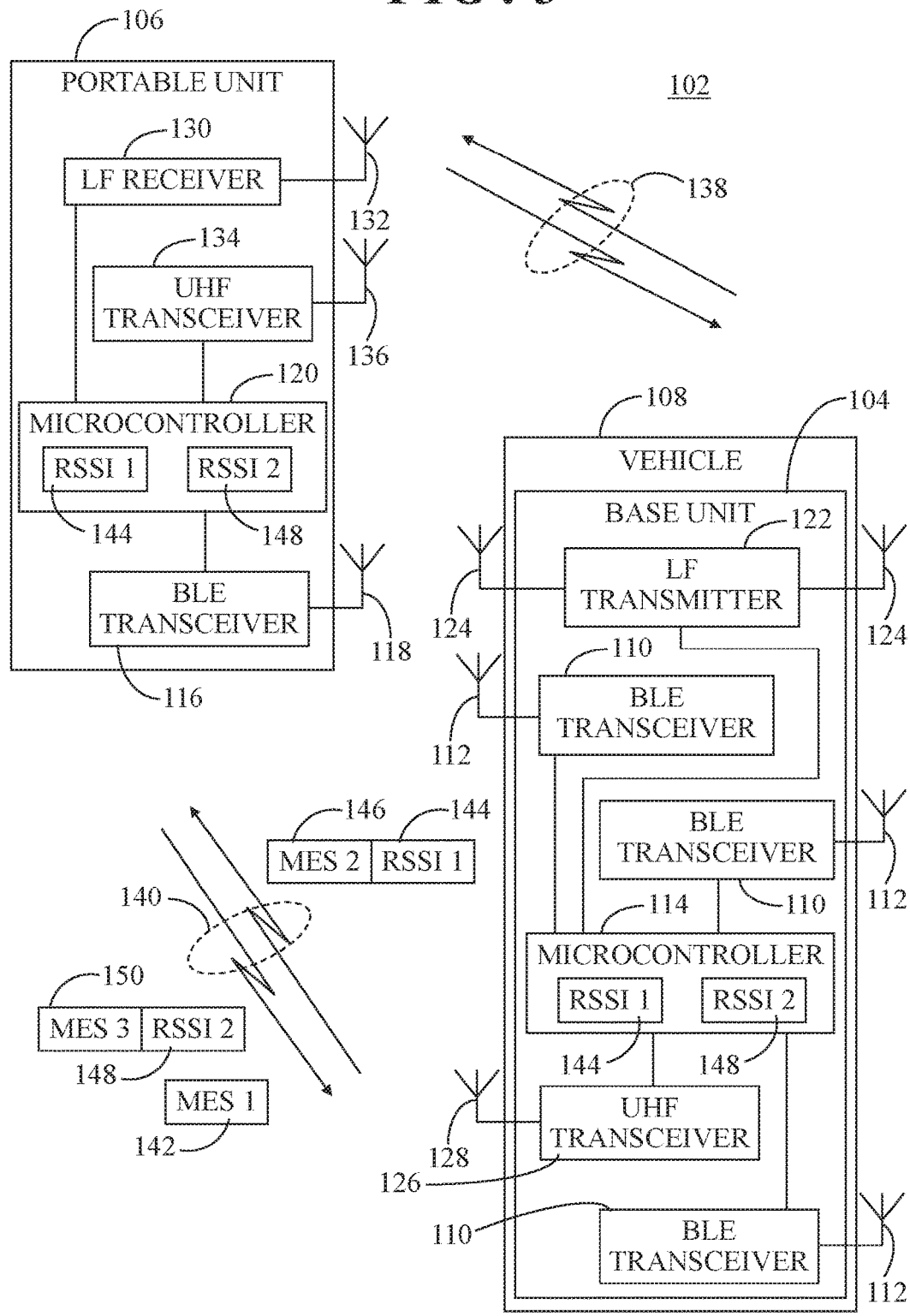
FIG. 5 shows a block diagram of a passive keyless entry system in accordance with another embodiment.

FIG. 5 shows a block diagram of a PKE system 102 in accordance with another embodiment. PKE is based on multiple radio technologies. In this example, PKE system 102 functions as a standard PKE system (such as PKE system 20 of FIG. 1) to enable remote control features of a portable unit and further includes Bluetooth wireless technology for relay attack detection.

PKE system 102 includes a base unit 104 and a portable unit 106. Base unit 104 is associated with (e.g., located within) an object (e.g., a vehicle 108) to be secured against unauthorized access. Portable unit 106 (such as a key fob, wallet card, smartphone, and so forth) may be carried by an operator of vehicle 108. Base unit 104 generally includes one or more first transceivers 110 coupled to associated antennas 112. A first microcontroller 114 is coupled to each of first transceivers 110. Portable unit 106 generally includes a second transceiver 116 coupled to an antenna 118, and a second microcontroller 120 coupled to second transceiver 118. In this example, first and second transceivers 110, 116 may be Bluetooth transceivers, and more particularly Bluetooth Low Energy (BLE) transceivers. Thus, first and second transceivers 110, 116 may be referred to herein as first and second BLE transceivers 110, 116.

In PKE system 102, base unit 104 additionally includes a plurality of low frequency (LF) transmitters 122 (one shown for simplicity) coupled to antennas 124 and an ultra-high frequency (UHF) transceiver 126 coupled to an antenna 128. LF transmitters 122 and UHF transceiver 126 may also be connected to first microcontroller 114. In this example, LF transmitters and UHF transceiver 126 may be collectively considered a third transceiver within PKE system 102 that operates using a different wireless communication technology than BLE transceivers 110. BLE transceivers 110 and LF transmitters 122 may be installed at various locations around vehicle 108 (e.g., inside each door near the door handles, in the trunk, and so forth). Portable unit 106 may additionally include an LF receiver 130 coupled to an antenna 132 and a UHF transceiver 134 coupled to an antenna 136. LF receiver 130 and UHF transceiver 134 may also be connected to second microcontroller 120. In this example, LF receiver 130 and UHF receiver 134 may be collectively considered a fourth transceiver within PKE system 102 that operates using the same wireless communication technology as the third transceiver of base unit 104. Thus, PKE system 102 implements a combination of the conventional wireless communication system described in connection with FIG. 1 and the Bluetooth-based system described in connection with FIG. 4.

In the illustrative example, an encrypted connection (e.g., a first bidirectional wireless communication link 138) may be established between the third and fourth transceivers (e.g., LF transmitter 122, UHF transceiver 126, LF receiver 130, and UHF transceiver 134) as discussed in detail above in connection with FIG. 1. In accordance with some embodiments, following establishment of first bidirectional wireless communication link 138, a second bidirectional wireless communication link 140 is established between first and second transceivers 110, 116 per a Bluetooth wireless standard. First bidirectional wireless communication link 138 is established to wake up portable unit 106 and to communicate data between the third and fourth transceivers that is relevant to enabling implementation of the remote control features of portable unit 106. Second bidirectional wireless communication link 140 is established for detecting a relay attack based upon the RSSI values of messages exchanged between first and second transceivers 110, 116.

In some configurations, first bidirectional wireless communication link 138 is established to wake up portable unit 106. However, data for enabling implementation of the remote control features may not be communicated between the third and fourth transceivers until a determination is made that a relay attack is not detected. In other configurations, bidirectional wireless communication link 140 may initially be established to detect whether a relay attack is being attempted and when a relay attack is not occurring, bidirectional wireless communication link 138 may thereafter be established. Regardless, following establishment of second bidirectional wireless communication link 140, base and portable units 104, 106 are configured to exchange messages for the purpose of detecting a relay attack.

Like PKE system 70 (FIG. 4), for each of the messages received at the base unit 104 via second bidirectional wireless communication link 140 at first transceiver 110, first microcontroller 114 measures a received signal strength indicator (RSSI) value of the received message and sends the RSSI value in a subsequent message to portable unit 106. For each of the messages received at portable unit 106 via second bidirectional wireless communication link 140 at second transceiver 116, second microcontroller 120 measures a second RSSI value of the received message and sends the second RSSI value in another subsequent message to base unit 104. Thus, for every received message, the RSSI value is measured and sent to the other party during the next message exchanged. Thereafter, at least one of first and second microcontrollers 110, 116 is configured to determine whether relay attack 54 (FIG. 3) is occurring in response to the first and second RSSI values.

In the illustrative example provided in FIG. 5, second bidirectional wireless communication link 140 has been established. A first message 142 is transmitted from portable unit 106 via BLE transceiver 116/antenna 118. First message 142 is received at base unit 104, and first microcontroller 114 measures a first RSSI value 144 of first message 142. First microcontroller 114 may additionally retain, or otherwise save, the measured first RSSI value 144. Thereafter, first microcontroller 114 sends first RSSI value 144 in a second message 146 to portable unit 106 via BLE transceiver 110/antenna 112. Second message 146 is received at portable unit 106 at which point second microcontroller 120 measures a second RSSI value 148 of second message 146. Second microcontroller 120 may additionally retain, or otherwise save, the measured second RSSI value 148. Thereafter, second microcontroller 120 sends second RSSI value 148 in a third message 150 to base unit 104.

During this exchange of messages, each of first and second microcontrollers 114, 120 becomes cognizant of the measured first and second RSSI values 144, 148. At least one of first and second microcontrollers 114, 120 may determine whether relay attack 54 (FIG. 3) is occurring in response to a comparison of the measured first and second RSSI values 144, 148 as discussed in connection with FIG. 4. That is, if a difference between first and second RSSI values 144, 148 is not within a predefined threshold, relay attack 54 is detected and second bidirectional wireless communication link 140 may be terminated. First bidirectional wireless communication link 138 may also be terminated. However, if the difference between first and second RSSI values 144, 148 is within the predefined threshold, it may be presumed that relay attack 54 is not occurring and first bidirectional wireless communication link 138 may thereafter be utilized to enable vehicle remote control features (lock/unlock, vehicle start, etc.) of portable unit 106. Again, more detailed discussion of the use of measured RSSI values for the determination of a relay attack are provided below in connection with the flowcharts of FIGS. 6, 7, 9, and 10.

Although two PKE systems are described above in connection with FIGS. 4 and 5, other PKE systems may have relay attack detection capabilities based on the exchange of RSSI values. For example, another PKE system configuration may be similar to PKE system 102 of FIG. 5, but without UHF transceivers 126, 134 and their associated antennas 128, 136. In such a configuration, the LF technology may be used for wakeup of the portable unit and precise localization and the Bluetooth technology may be used for relay attack detection and defense, and for data transfer to enable the vehicle remote control features of the portable unit.

Figure 6:
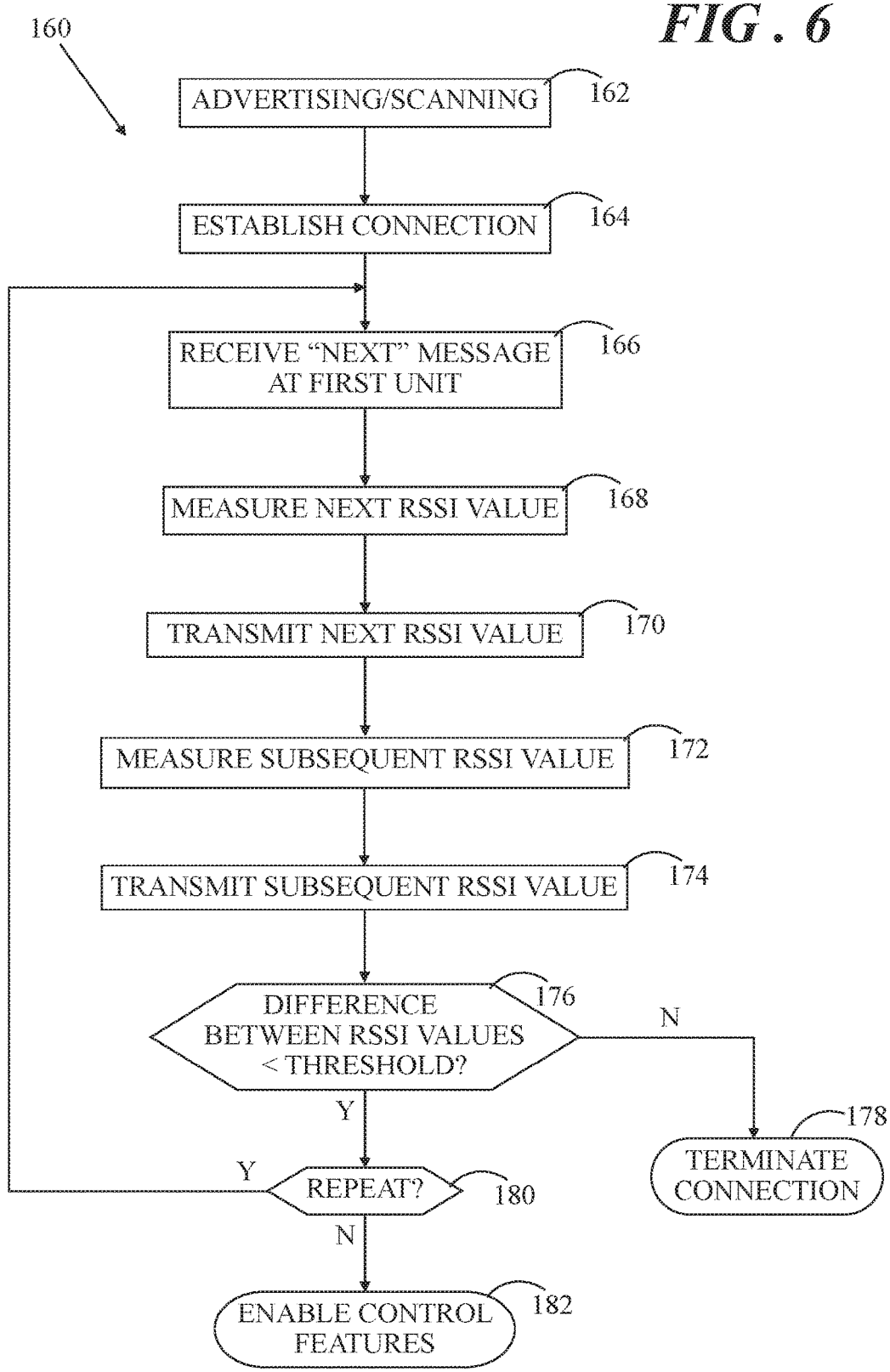
FIG. 6 shows a flowchart of a received signal strength indicator (RSSI) value comparison process in accordance with some embodiments.
Figure 7:
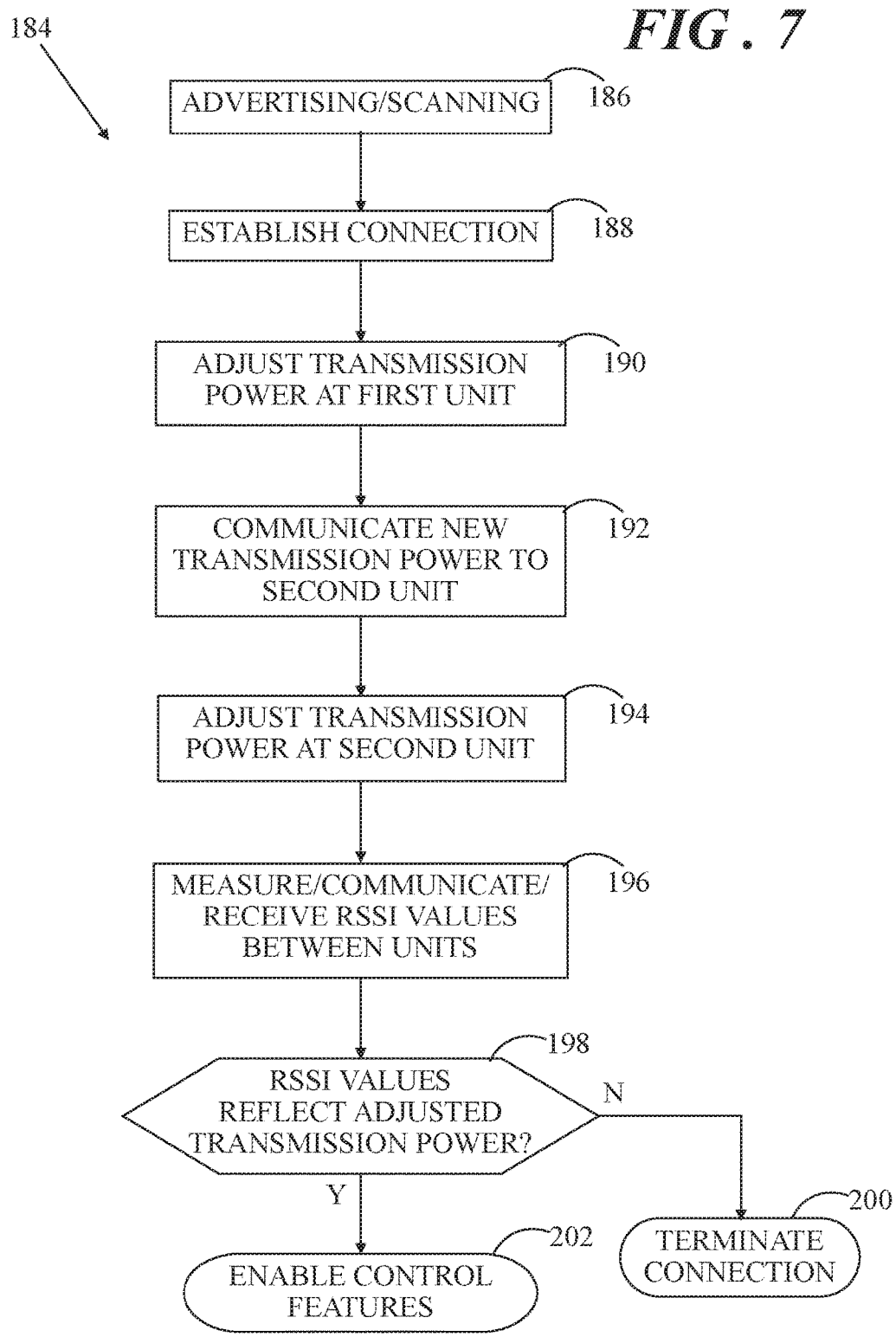
FIG. 7 shows a flowchart of a transmission power adjust process in accordance with some embodiments.
Figure 9:
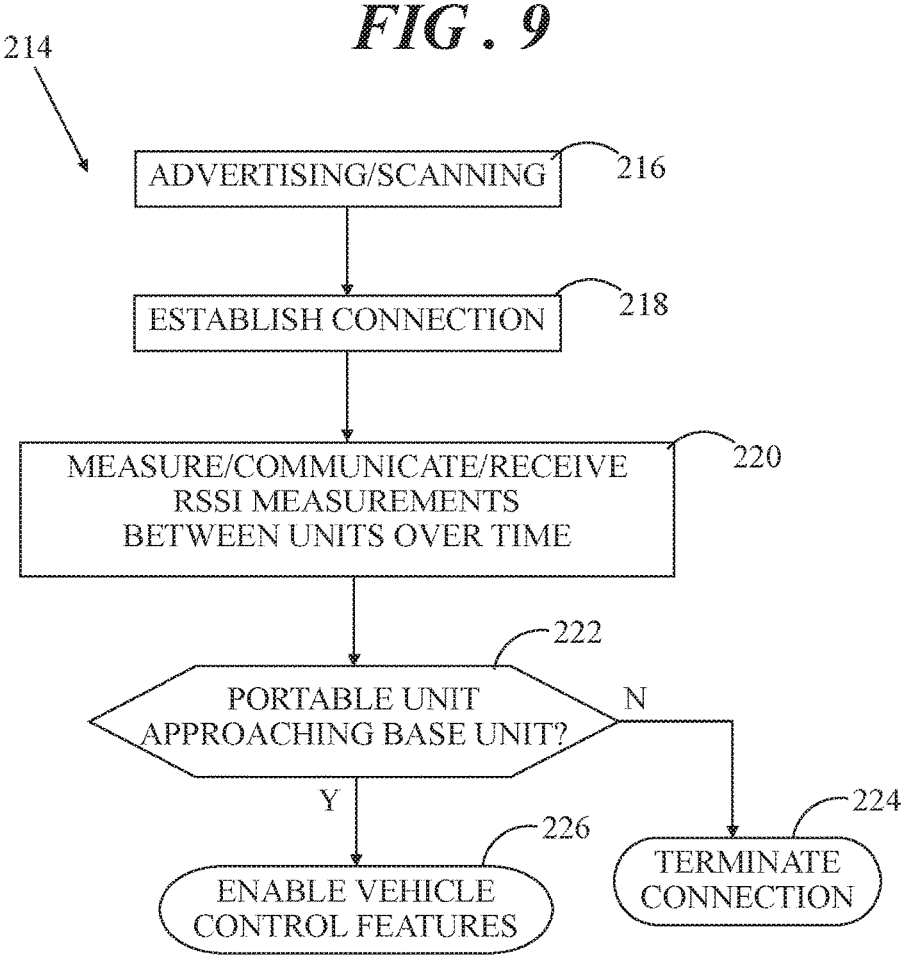
FIG. 9 shows a flowchart of an approach detection process in accordance with some embodiments.
Figure 10:
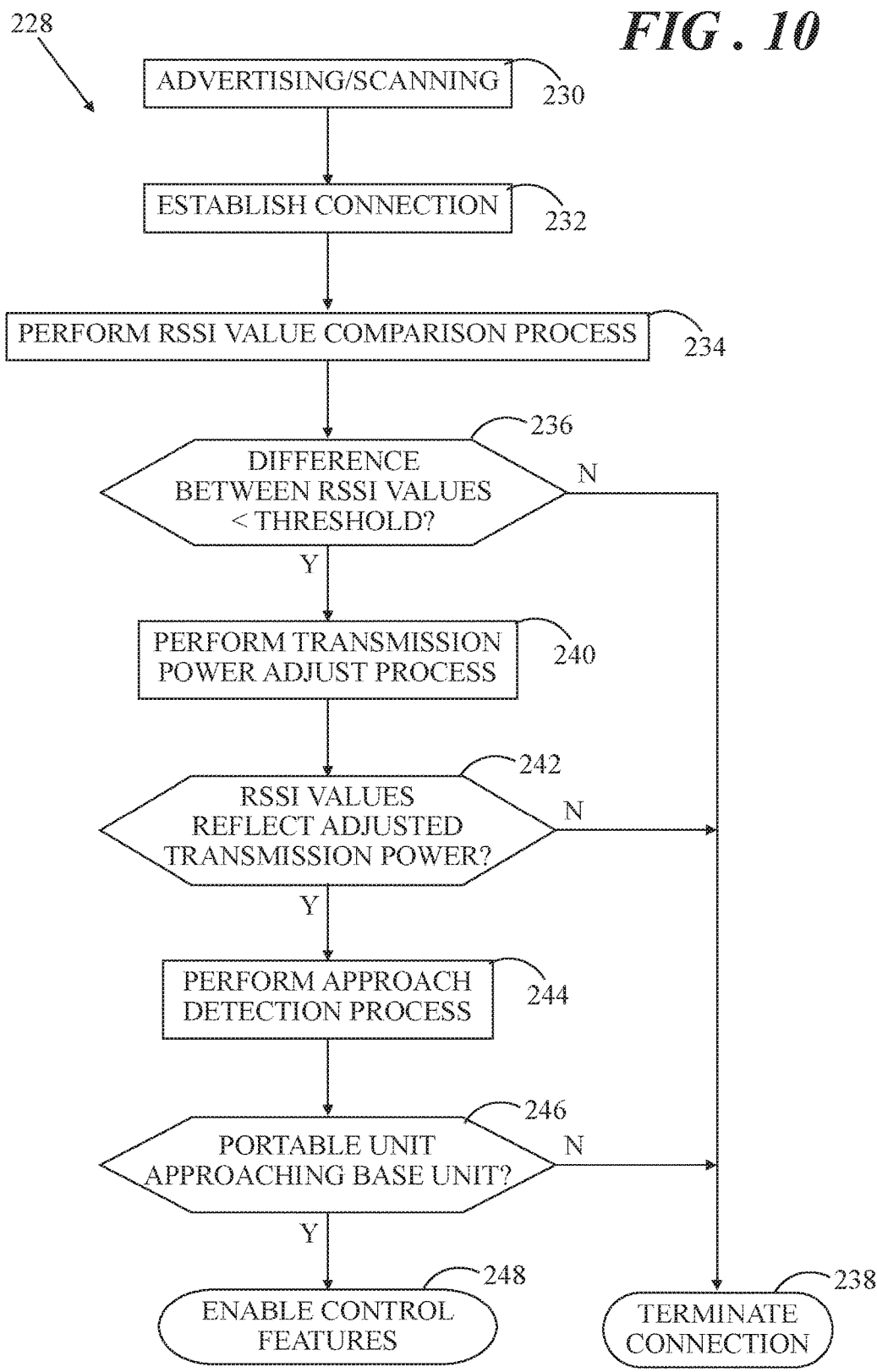
FIG. 10 shows a flowchart implementing the processes of FIGS. 6, 7, and 9 to defend against unauthorized access to an object, such as a vehicle.

The following discussion applies to methodology for detecting relay attacks in PKE systems such as PKE system 70 (FIG. 4), PKE system 102 (FIG. 5), or variants that include Bluetooth wireless technology as discussed above. FIGS. 6, 7, and 9 illustrate individual processes that may be performed to detect relay attacks based upon RSSI value measurements performed at the base and portable units. FIG. 10 combines the individual processes of FIGS. 6, 7, and 9 as subprocesses within an enhanced security relay attack detection process.

FIG. 6 shows a flowchart of an RSSI value comparison process 160 in accordance with some embodiments. For ease of explanation, RSSI value comparison process 160 is discussed in connection with PKE system 70 (FIG. 4). Hence, FIG. 4 should be viewed concurrently with FIG. 6 in the following discussion.

At a block 162, one of base and portable units 72, 74 is in an advertising status, thereby transmitting the availability of the device to establish a connection. Additionally, the other one of base and portable units 72, 74 is in a scanning status, thereby listening for the advertising device. At a block 164, a connection is established. For example, bidirectional wireless communication link 90 is established between base unit 72 and portable unit 74 per a Bluetooth wireless standard so that base and portable units 72, 74 can begin to exchange messages.

At a block 166, one of the units (e.g., one of base unit 72 and portable unit 74) receives a "next" message. During a first iteration, the "next" message may be a first message following establishment of bidirectional wireless communication link 90. In this example, base unit 72 receives first message 92 from portable unit 74. At a block 168, the receiving unit measures a "next" RSSI value of the received message. Again, during a first iteration, the "next" RSSI value will be a first RSSI value of the first message. In this example, base unit 72 measures first RSSI value 94. At a block 170, the measured "next" RSSI value, is transmitted from the first unit to the second unit. Again, in this example, base unit 72 transmits first RSSI value 94 to portable unit 74 in second message 96 via first bidirectional wireless communication link 90.

At a block 172, a subsequent RSSI value of the received subsequent message is measured at the second unit. In this example, second RSSI value 98 is measured at portable unit 74. At a block 174, the measured subsequent RSSI value is transmitted from the second unit to the first unit in a subsequent message. In the illustrated example, second RSSI value 98 is transmitted from portable unit 74 to base unit 72 in third message 100 via first bidirectional wireless communication link 90.

At a query block 176, at least one of the base and portable units (e.g., base and portable units 72, 74) computes a difference between the two measured RSSI values. For example, a difference value is computed between first and second RSSI values 94, 98. This difference is then compared with a predetermined threshold. In some embodiments, the predetermined threshold may be a numerical range having a high and a low delineator. The difference value should fall within this numerical range thereby indicating that first and second RSSI values 94, 98 are very similar. Due to symmetry in electromagnetism, this similarity indicates that the messages are being communicated directly between the base and portable units without intervening relay stations (e.g., relay stations 56, 58 of FIG. 3), with some differences due mainly to small variations in the transmission power and environmental changes (e.g., movement of the operating holding portable unit 74). If the difference does not fall within this numerical threshold range, first and second RSSI values 94, 98 are sufficiently dissimilar due to the variability of first and second distances 66, 68 (FIG. 3), thereby indicating relay attack 54 (FIG. 3) may be occurring.

When a determination is made at query block 176 that the difference between the two measured RSSI values is not within the predetermined threshold range, process control of RSSI value comparison process 160 proceeds to a termination block 178 at which bidirectional wireless communication link 90 is terminated by at least one of base and portable units 72, 74. However, when a determination is made at query block 176 that the difference between the two measured RSSI values is within the predetermined threshold range, process control of RSSI value comparison process 160 continues with a query block 180.

At query block 180, a determination is made as to whether the exchange of messages, measurement of RSSI values, and communication of the measured RSSI values should be repeated. By way of example, the comparison of measured RSSI values may be repeated multiple times to confirm that a relay attack is not occurring. If the process operations are to be repeated for subsequent messages, process control of RSSI value comparison process 160 loops back to block 166 so as to repeat the process operations of blocks 166, 168, 172, 174, and 176. When the process operations have been performed a suitable number of times, RSSI value comparison process 160 continues at a termination block 182. At block 182, the remote control features of portable unit 74 are enabled. That is, no relay attack has been detected and portable unit 74 is allowed to perform its control functions (e.g., unlock, vehicle start, and so forth).

Referring now to FIG. 7, FIG. 7 shows a flowchart of a transmission power adjust process 184 in accordance with some embodiments. For ease of explanation, transmission power adjust process 184 is discussed in connection with PKE system 70 (FIG. 4). Hence, FIG. 4 should be viewed concurrently with FIG. 7 in the following discussion.

At a block 186, one of base and portable units 72, 74 is in an advertising status, thereby transmitting the availability of the device to establish a connection. Additionally, the other one of base and portable units 72, 74 is in a scanning status, thereby listening for the advertising device. At a block 188, a connection is established. For example, bidirectional wireless communication link 90 is established between base unit 72 and portable unit 74 per a Bluetooth wireless standard so that base and portable units 72, 74 can begin to exchange messages.

At a block 190, a first unit (e.g., one of base and portable units 72, 74) randomly adjusts a transmission power for subsequent messages transmitted from the first unit and at a block 192, the first unit communicates the new transmission power to the other unit (e.g., the other of base and portable units). In response, at a block 194, the other unit also adjusts the transmission power for subsequent messages transmitted from the second unit to the new transmission power. At a block 196, following adjustment to the new transmission power, RSSI values of subsequent messages are measured, communicated, and received between base and portable units 72, 74 as discussed extensively above.

At a query block 198, the RSSI values are evaluated to determine whether they reflect the adjusted transmission power. In this dual-sided configuration, a difference between pairs of RSSI values should fall within a predetermined threshold, such as a numerical range centered at the adjusted transmission power thereby indicating the similarity of RSSI values. Alternatively, the individual RSSI values (in lieu of the difference) could be suitably compared to the expected adjusted transmission power. If the RSSI values do not reflect the adjusted transmission power, a determination can be made that a relay attack is occurring. As such, control continues to a termination block 200 at which bidirectional wireless communication link 90 is terminated by at least one of base and portable units 72, 74. If the RSSI values do reflect the adjusted transmission power, control continues to a termination block 202. At block 202, the remote control features of portable unit 74 are enabled. That is, no relay attack has been detected and portable unit 74 is allowed to perform its control functions (e.g., unlock, vehicle start, and so forth).

Figure 8:
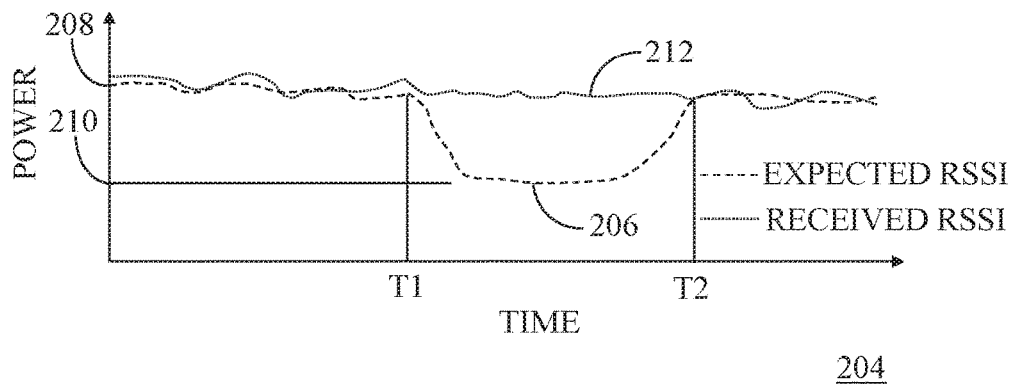
FIG. 8 shows a graph of an example of expected and received RSSI signatures in response to the transmission power adjust process of FIG. 7.

Referring now to FIG. 8 in connection with transmission power adjust process 184 of FIG. 7, FIG. 8 shows a graph 204 of an example of expected and received RSSI signatures 206, 212 in response to execution of transmission power adjust process 184. In accordance with execution of transmission power adjust process 184, base and portable units 72, 74 reduce transmission power of messages from a first transmission power 208 to a second transmission power 210 at a time, T1. Base and portable units 72, 74 are continuously measuring RSSI values per block 196 of process 184. Thus, the measured RSSI values for messages received following time, T1, should reflect commensurate reductions as observed in expected RSSI signature 206. At a later instant in time, e.g., T2, base and portable units 72, 74 may resume communication of messages at first transmission power 208. Accordingly, the measured RSSI values received following time, T2 should reflect the commensurate return to first transmission power 208 as also observed in expected RSSI signature 206. A relay station may not be able to adjust the output transmission power and may continue to transmit messages at the same transmission power, e.g., first transmission power 208, as observed by received RSSI value signature 212, thereby indicating a relay attack.

Thus, in order to trick PKE system 70 employing transmission power adjust process 184 during a relay attack, the relay station attacker would require a sophisticated relay station capable of detecting the signal strength at one of the relay stations and immediately change the transmission power on the other relay station accordingly, while keeping in consideration also the differing first and second distances 66, 68 (FIG. 3).

Although a configuration is described in which both base and portable units 72, 74 change transmission power, the transmission power adjustment may also be done by only one of base and portable units 72, 74. The device altering its transmission power notifies the other party over the already established encrypted connection (e.g., bidirectional wireless communication link 90) of the adjusted transmission power so that the other device knows what change is expected. This one-sided transmission power modification may be useful in scenarios where the manufacturer of the PKE system has complete control of one of the devices (e.g., base unit 72 in vehicle 76) but not of the other (e.g., portable unit 74, which may also be any Bluetooth enabled smartphone which may not be able to alter the transmission power).

FIG. 9 shows a flowchart of an approach detection process 214 in accordance with some embodiments. Again, for ease of explanation, approach detection process 214 is discussed in connection with PKE system 70, and FIG. 4 should be viewed concurrently with FIG. 9 in the following discussion.

At a block 216, one of base and portable units 72, 74 is in an advertising status and the other one of base and portable units 72, 74 is in a scanning status. At a block 218, a connection is established. For example, bidirectional wireless communication link 90 is established between base unit 72 and portable unit 74 per a Bluetooth wireless standard so that base and portable units 72, 74 can begin to exchange messages. At a block 220, as messages are exchanged, RSSI values are measured, communicated, and received between base and portable units 72, 74 as discussed extensively above.

At a query block 222, a determination is made as to whether portable unit 74 is approaching base unit 72 by evaluating the measured RSSI values to determine whether they resemble an approaching pattern of portable unit 74 moving toward vehicle 76 in which base unit 72 is located. More particularly, at least one of first and second microcontrollers 82, 84 of base and portable units 72, 74 is configured to track an RSSI history of multiple RSSI values measured at block 220 and determine whether portable unit 74 is approaching vehicle 76 based upon a comparison of later measured RSSI values to earlier measured RSSI values. In an RSSI history, a sequence of measured RSSI values should have an increasing trend over time to indicate that base and portable units 72, 74 are getting closer together, thus the signal is getting stronger. If the RSSI values do not reflect this increase in signal strength, a determination can be made that a relay attack is occurring.

As such, at query block 222, when a determination is made that portable unit 74 is not approaching base unit 72, control continues to a termination block 224 at which bidirectional wireless communication link 90 is terminated by at least one of base and portable units 72, 74. When a determination is made that portable unit 74 is approaching base unit 72, control continues to a termination block 226. At block 226, the remote control features of portable unit 74 are enabled. That is, no relay attack has been detected and portable unit 74 is allowed to perform its control functions (e.g., unlock, vehicle start, and so forth).

FIG. 10 shows a flowchart implementing the processes of FIGS. 6, 7, and 9 to defend against unauthorized access to an object, such as a vehicle. More particularly, FIG. 10 combines the individual processes of FIGS. 6, 7, and 9 as subprocesses within an enhanced security relay attack detection process 228. In enhanced security relay attack detection process 228, only a subset of blocks from RSSI value comparison process 160 (FIG. 6), transmission power adjust process 184 (FIG. 7), and approach detection process 214 (FIG. 9) may be performed. Accordingly, reference will be made to the particular blocks of processes 160, 184, and 214 that may be performed during execution of enhanced security relay attack detection process 228. For continuity with the prior descriptions of the processes, enhanced security relay attack detection process 228 will be discussed in connection with PKE system 70. Thus, FIG. 4 should be viewed in connection with FIG. 10. It should be understood however, that the following methodology applies to PKE system 102 (FIG. 5) and its variants mentioned above.

At a block 230, one of base and portable units 72, 74 is in an advertising status, thereby transmitting the availability of the device to establish a connection. Additionally, the other one of base and portable units 72, 74 is in a scanning status, thereby listening for the advertising device. At a block 232, a connection is established. For example, bidirectional wireless communication link 90 is established between base unit 72 and portable unit 74 per a Bluetooth wireless standard so that base and portable units 72, 74 can begin to exchange messages.

At a block 234, RSSI value comparison process 160 (FIG. 6) is performed. In an example, the operations of blocks 166, 168, 170, 172, and 174 of RSSI value comparison process 160 may be performed. Thereafter, at a query block 236 of enhanced security relay attack detection process 228, at least one of the base and portable units (e.g., base and portable units 72, 74) computes a difference between two measured RSSI values. For example, a difference value is computed between first and second RSSI values 94, 98. This difference can then be compared with a predetermined threshold. When a determination is made at query block 236 that the difference between the two measured RSSI values is not within the predetermined threshold range, process control of enhanced security relay attack detection process 228 proceeds to a termination block 238 at which bidirectional wireless communication link 90 is terminated by at least one of base and portable units 72, 74. However, when a determination is made at query block 236 that the difference between the two measured RSSI values is within the predetermined threshold range, process control of enhanced security relay attack detection process 228 may continue with a block 240.

At block 240, transmission power adjust process 184 (FIG. 7) is performed. By way of example, the operations of blocks 190, 192, 194, and 196 of transmission power adjust process 184 may be performed. Thereafter, at a query block 242 of enhanced security relay attack detection process 228, the RSSI values are evaluated to determine whether they reflect the adjusted transmission power. If the RSSI values do not reflect the adjusted transmission power, a determination can be made that a relay attack is occurring. As such, control continues to termination block 238 at which bidirectional wireless communication link 90 is terminated by at least one of base and portable units 72, 74. If the RSSI values do reflect the adjusted transmission power, process control of enhanced security relay attack detection process 228 may continue with a block 244.

At block 244, approach detection process 214 (FIG. 9) is performed. By way of example, the operations of block 220 of approach detection process 214 may be performed. Thereafter, at a query block 246 of enhanced security relay attack detection process 228, a determination is made as to whether portable unit 74 is approaching base unit 72 by evaluating the measured RSSI values to determine whether they reflect an increase in signal strength. When the measured RSSI values do not reflect an increase in signal strength, a determination can be made that it is unlikely that portable unit 74 is approaching base unit 72. Therefore, a relay attack may be occurring. When a determination is made at query block 246 that portable unit 74 is not approaching base unit 72, control continues to termination block 238 at which bidirectional wireless communication link 90 is terminated by at least one of base and portable units 72, 74. When a determination is made that portable unit 74 is approaching base unit 72, control continues to a termination block 248. At block 248, the control features of portable unit 74 are enabled. That is, no relay attack has been detected and portable unit 74 is allowed to perform its remote control functions (e.g., unlock, vehicle start, and so forth).

Accordingly, FIG. 10 illustrates three successive layers of security for detecting relay attacks based on measured RSSI values of signals transmitted between a portable unit (e.g., key fob, wallet card, smartphone, and so forth) and a base unit associated with an object (e.g., vehicle, building, portion of a building, and so forth) to be secured against unauthorized access. Although FIG. 10 implements all three of RSSI value comparison process 160, transmission power adjust process 184, and approach detection process 214, it should be understood that other embodiments may implement any two of the three processes 160, 184, 214. Further, the operations of FIGS. 6, 7, 9, and 10 may be performed in the orders shown or in a different order as desired. Additionally, two or more processes and/or two or more operations may be performed in parallel instead of in series.

Embodiments described herein entail systems and methodology for defending against relay attacks on passive keyless entry (PKE) systems. An embodiment of a system comprises a first unit associated with an object to be secured against unauthorized access, the first unit comprising a first transceiver and first processing circuitry coupled to the first transceiver, and a second unit comprising a second transceiver and second processing circuitry coupled to the second transceiver. The first and second units are configured to establish a bidirectional wireless communication link between the first and second units and following establishment of the bidirectional wireless communication link, the first and second units are configured to exchange messages. For at least one of the messages received at the first unit, the first processing circuitry is configured to measure a first received signal strength indicator (RSSI) value of the received message and send the first RSSI value in a subsequent message to the second unit. For at least one of the messages received at the second unit, the second processing circuitry is configured to measure a second RSSI value of the received message and send the second RSSI value in another subsequent message to the first unit, and at least one of the first and second processing circuitry is configured to determine whether a relay attack is occurring in response to a comparison of the first and second RSSI values.

An embodiment of method for detecting a relay attack comprises establishing a bidirectional wireless communication link between a second unit and a first unit associated with an object to be secured against unauthorized access and exchanging messages between the first and second units following the establishing operation. The method further comprises for at least one of the messages received at the first unit, measuring a first received signal strength indicator (RSSI) value of the received message and communicating the first RSSI value from the first unit in a subsequent message to the second unit. The method further comprises for at least one of the messages received at the second unit, measuring a second RSSI value of the received message, communicating the second RSSI value from the second unit in another subsequent message to the first unit, and determining by one of the first and or second units whether the relay attack is occurring in response to a comparison of the first and second RSSI values.

An embodiment of a passive keyless entry (PKE) system comprises a base unit residing with an object to be secured against unauthorized access, the base unit comprising a first Bluetooth transceiver and first processing circuitry coupled to the first Bluetooth transceiver and a portable unit comprising a second Bluetooth transceiver and second processing circuitry coupled to the second Bluetooth transceiver.

The base and portable units are configured to establish a bidirectional wireless communication link between the first and second units and following establishment of the bidirectional wireless communication link, the base and portable units are configured to exchange messages. For at least one of the messages received at the base unit, the first processing circuitry is configured to measure a first received signal strength indicator (RSSI) value of the received message and send the first RSSI value in a subsequent message to the portable unit. For at least one of the messages received at the portable unit, the second first processing circuitry is configured to measure a second RSSI value of the received message and send the second RSSI value in another subsequent message to the base unit. At least one of the first and second processing circuitry is configured to determine whether a relay attack is occurring in response to a comparison of the first and second RSSI values, wherein the at least one of the base and portable units is configured to terminate the bidirectional wireless communication link when a difference between the first and second RSSIs is outside of a predetermined threshold, and the at least one of the base and portable units is configured to enable implementation of remote control features of the portable unit when the difference between the first and second RSSIs is within the predetermined threshold.

Thus, the system and methodology provide countermeasures against relay attacks for PKE systems based at least in part on the equality of received signal strength indicator (RSSI) values measured by both a portable unit and a base unit, in which the base unit is associated with an object to be secured against unauthorized access. The measured RSSI values are compared to verify that they agree and thus the likelihood of a relay attack is lower. The methodology may be combined, in some embodiments, with a variable transmission power technique and/or an RSSI tracking technique over time (both techniques using RSSI values measured by both of the portable and base units) to greatly improve security against relay attacks.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
   a first unit associated with an object to be secured against unauthorized access, the first unit comprising a first transceiver and first processing circuitry coupled to the first transceiver; and
   a second unit comprising a second transceiver and second processing circuitry coupled to the second transceiver; wherein
   the first and second units are configured to establish a bidirectional wireless communication link between the first and second units;
   following establishment of the bidirectional wireless communication link, the first and second units are configured to exchange messages;
   for at least one of the messages received at the first unit, the first processing circuitry is configured to measure a first received signal strength indicator (RSSI) value of the received message and send the first RSSI value in a subsequent message to the second unit;
   for at least one of the messages received at the second unit, the second processing circuitry is configured to measure a second RSSI value of the received message and send the second RSSI value in another subsequent message to the first unit; and
   at least one of the first and second processing circuitry is configured to determine whether a relay attack is occurring in response to a comparison of the first and second RSSI values.

2. The system of claim 1 wherein at least one of the first unit and the second unit is configured to terminate the bidirectional wireless communication link when a difference between the first and second RSSI values is outside of a predetermined threshold.

3. The system of claim 1 wherein at least one of the first unit and the second unit is configured to enable implementation of remote control features of the second unit when a difference between the first and second RSSI values is within a predetermined threshold.

4. The system of claim 1 wherein the first and second transceivers are each characterized as a Bluetooth transceiver device or as a Bluetooth low energy (BLE) transceiver device.

5. The system of claim 1 wherein the system comprises a passive keyless entry (PKE) system, the first unit comprises a base unit residing with the object, and the second unit comprises a portable unit.

6. The system of claim 1 wherein:
   at least one of the first unit and the second unit is further configured to adjust a first transmission power of messages exchanged between the first and second units to a second transmission power and notify the other of the first unit and second unit of the second transmission power;
   following adjustment to the second transmission power, the first processing circuitry is configured to measure a third RSSI value of a third message received at the first unit and the first unit is configured to communicate the third RSSI value in a fourth message to the second unit;
   the second processing circuitry is configured to measure a fourth RSSI value of the fourth message received at the second unit and the second unit is configured to communicate the fourth RSSI value in another subsequent message to the first unit; and
   at least one of the first and second processing circuitry is configured to determine whether the relay attack is occurring based upon the third and fourth RSSI values, wherein at least one of the first and second units is configured to terminate the bidirectional wireless communication link when at least one of the third and fourth RSSI values does not reflect the second transmission power.

7. The system of claim 1 wherein at least one of the first and second processing circuitry is configured to track an RSSI history of multiple measured RSSI values and determine whether the second unit is approaching the object based upon a comparison of later measured RSSI values to earlier measured RSSI values, wherein at least one of the first and second units is configured to terminate the bidirectional wireless communication link when the comparison indicates that the second unit is not approaching the object.

8. The system of claim 1 wherein:
the messages for determining whether a relay attack is occurring are communicated between the first and second transceivers of the respective first and second units utilizing the bidirectional wireless communication link; and
the first and second units are configured to utilize the bidirectional wireless communication link between the first and second transceivers to enable implementation of remote control features of the second unit when a determination is made that the relay attack is not occurring.

9. The system of claim 1 wherein:
the bidirectional wireless communication link is a first bidirectional wireless communication link;
the messages for determining whether a relay attack is occurring are communicated between the first and second transceivers of respective first and second units utilizing a second bidirectional wireless communication link;
the first unit further comprises a third transceiver coupled to the first processing circuitry; and
the second unit further comprises a fourth transceiver coupled to the second processing circuitry, and the first and second units are configured to enable implementation of remote control features of the second unit utilizing the first bidirectional wireless communication link between the third and fourth transceivers when a determination is made that the relay attack is not occurring.

10. A method for detecting a relay attack comprising:
establishing a bidirectional wireless communication link between a second unit and a first unit associated with an object to be secured against unauthorized access;
exchanging messages between the first and second units following the establishing operation;
for at least one of the messages received at the first unit, measuring a first received signal strength indicator (RSSI) value of the received message;
communicating the first RSSI value from the first unit in a subsequent message to the second unit;
for at least one of the messages received at the second unit, measuring a second RSSI value of the received message;
communicating the second RSSI value from the second unit in another subsequent message to the first unit; and
determining by one of the first and or second units whether the relay attack is occurring in response to a comparison of the first and second RSSI values.

11. The method of claim 10 further comprising:
terminating the bidirectional wireless communication link when a difference between the first and second RSSI values is outside of a predetermined threshold; and
enabling implementation of remote control features of the second unit when the difference between the first and second RSSIs is within the predetermined threshold.

12. The method of claim 10 further comprising:
adjusting a first transmission power of messages exchanged between the first and second units to a second transmission power, the adjusting being performed by at least one of the first unit and the second unit;
notifying the other of the first unit and the second unit of the second transmission power;
following adjustment to the second transmission power, measuring a third RSSI value of a third message received at the first unit;
communicating the third RSSI value from the first unit in a fourth message to the second unit;
measuring a fourth RSSI value of the fourth message;
communicating the fourth RSSI value from the second unit in another subsequent message to the first unit;
determining that the relay attack is occurring when at least one of the third and fourth RSSIs does not reflect the second transmission power; and
terminating the bidirectional wireless communication link in response to determining that the relay attack is occurring.

13. The method of claim 10 further comprising:
tracking an RSSI history based upon a plurality of measured RSSI values; and
determining whether the second unit is approaching the object based upon a comparison of later measured ones of the plurality of RSSI values to earlier measured ones of the plurality of RSSI values; and
terminating the bidirectional wireless communication link when the comparison indicates that the second unit is not approaching the object.

14. The method of claim 10 further comprising:
utilizing the bidirectional wireless communication link to communicate the messages for determining whether a relay attack is occurring between the first and second units; and
utilizing the bidirectional wireless communication link to enable implementation of remote control features of the second unit when a determination is made that the relay attack is not occurring.

15. The method of claim 14 wherein the first and second units include a Bluetooth transceiver system, and the bidirectional wireless communication link is a Bluetooth connection.

16. The method of claim 10 wherein the bidirectional wireless communication link is a first bidirectional wireless communication link, and the method further comprises:
utilizing a second bidirectional wireless communication link to communicate the messages between the first and second units for determining whether the relay attack is occurring; and
utilizing the first bidirectional wireless communication link to enable implementation of remote control features of the second unit when a determination is made that the relay attack is not occurring.

17. The method of claim 16 wherein the first bidirectional wireless communication link is a non-Bluetooth connection established via a first transceiver system of the first and second units, and the second bidirectional wireless communication link is a Bluetooth connection established via a Bluetooth transceiver system of the first and second units.

18. A passive keyless entry (PKE) system comprising:
a base unit residing with an object to be secured against unauthorized access, the base unit comprising a first Bluetooth transceiver and first processing circuitry coupled to the first Bluetooth transceiver; and
a portable unit comprising a second Bluetooth transceiver and second processing circuitry coupled to the second Bluetooth transceiver; wherein
the base and portable units are configured to establish a bidirectional wireless communication link between the first and second units;

following establishment of the bidirectional wireless communication link, the base and portable units are configured to exchange messages;

for at least one of the messages received at the base unit, the first processing circuitry is configured to measure a first received signal strength indicator (RSSI) value of the received message and send the first RSSI value in a subsequent message to the portable unit;

for at least one of the messages received at the portable unit, the second first processing circuitry is configured to measure a second RSSI value of the received message and send the second RSSI value in another subsequent message to the base unit; and at least one of the first and second processing circuitry is configured to determine whether a relay attack is occurring in response to a comparison of the first and second RSSI values, wherein the at least one of the base and portable units is configured to terminate the bidirectional wireless communication link when a difference between the first and second RSSIs is outside of a predetermined threshold, and the at least one of the base and portable units is configured to enable implementation of remote control features of the portable unit when the difference between the first and second RSSIs is within the predetermined threshold.

19. The system of claim 18 wherein:

at least one of the base unit and the portable unit is further configured to adjust a first transmission power of messages exchanged between the base and portable units to a second transmission power and notify the other of the base unit and portable unit of the second transmission power;

following adjustment to the second transmission power, the first processing circuitry is configured to measure a third RSSI value of a third message received at the base unit and the base unit is configured to communicate the third RSSI value in a fourth message to the portable unit;

the second processing circuitry is configured to measure a fourth RSSI value of the fourth message received at the portable unit and the base unit is configured to communicate the fourth RSSI value in another subsequent message to the first unit; and at least one of the first and second processing circuitry is configured to determine whether the relay attack is occurring based upon the third and fourth RSSI values, wherein at least one of the base and portable units is configured to terminate the bidirectional wireless communication link when at least one of the third and fourth RSSI values does not reflect the second transmission power.

20. The system of claim 18 wherein at least one of the first and second processing circuitry is configured to track an RSSI history based upon a plurality of measured RSSI values and determine whether the portable unit is approaching the object based upon a comparison of later measured ones of the plurality of RSSI values to earlier measured ones of the plurality of RSSI values, wherein at least one of the base and portable units is configured to terminate the bidirectional wireless communication link when the comparison indicates that the second unit is not approaching the object.

* * * * *